United States Patent
Yuri

(10) Patent No.: US 10,428,207 B2
(45) Date of Patent: Oct. 1, 2019

(54) RUBBER COMPOSITION

(71) Applicant: TOYO TIRE & RUBBER CO., LTD., Itami-shi, Hyogo (JP)

(72) Inventor: Takashi Yuri, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 50 days.

(21) Appl. No.: 15/787,921

(22) Filed: Oct. 19, 2017

(65) Prior Publication Data
US 2018/0171121 A1 Jun. 21, 2018

(30) Foreign Application Priority Data

Dec. 15, 2016 (JP) .................................. 2016-243066

(51) Int. Cl.
*C08L 9/06* (2006.01)

(52) U.S. Cl.
CPC ............. *C08L 9/06* (2013.01); *C08L 2205/03* (2013.01)

(58) Field of Classification Search
CPC ... C08L 9/06; C08L 2205/025; C08L 2205/03
See application file for complete search history.

(56) References Cited

U.S. PATENT DOCUMENTS

2003/0232905 A1* 12/2003 Ives et al. ............ C08K 5/0008 524/35
2007/0042193 A1* 2/2007 Wang ....................... B32B 7/12 428/423.1

FOREIGN PATENT DOCUMENTS

| JP | 2002-534548 A | 10/2002 |
|---|---|---|
| JP | 2011-79940 A | 4/2011 |
| JP | 2016-29118 A | 3/2016 |
| JP | 2016-30800 A | 3/2016 |
| WO | 00/40652 A2 | 7/2000 |

OTHER PUBLICATIONS https://www.industrialspec.com/about-us/blog/detail/what-are-elastomers-rubbers-elastomeric-material (Year: 2018).*

* cited by examiner

*Primary Examiner* — Nathan M Nutter
(74) *Attorney, Agent, or Firm* — Westerman, Hattori, Daniels & Adrian, LLP

(57) ABSTRACT

A rubber composition, comprises a rubber component; and a completely amorphous olefin based elastomer having a glass transition temperature Ig of −40 to 20° C. in an amount of 1 to 40 parts by mass when the entire amount of the rubber component is regarded as 100 parts by mass. It is preferred that the rubber composition further comprises a liquid rubber in an amount of 1 to 40 parts by mass.

5 Claims, No Drawings

RUBBER COMPOSITION

BACKGROUND OF THE INVENTION

Field of the Invention

The present invention relates to a rubber composition excellent in workability. This rubber composition is useful as a raw material for a vulcanized rubber for tires that is excellent in rigidity and wet performance.

Description of the Related Art

Tires are generally used in various running environments, and are required to be improved in wet performance, which is gripping performance on a wet road surface, for example, in rain. When a blend design for a rubber composition is made to improve this wet performance, the resultant vulcanized rubber may be lowered in rigidity so that a tire of the rubber may be deteriorated, for example, in steering stability. In short, the wet performance and the rigidity of tires are contradictorily related to each other, and it has been therefore required to develop a technique for improving these properties with a good balance.

In order to attain compatibility between low exothermicity and high modulus of a pneumatic tire, Patent Document 1 listed below describes a technique of blending an acid-modified polyolefin and a polyolefin into a rubber composition including a diene rubber.

In order to improve the workability of a rubber composition which is a raw material for pneumatic tires, Patent Document 2 listed below describes a technique of blending, into a rubber composition, an acid-modified polyolefin having a melt mass flow rate of 100 q/10-min., or more.

In order to improve a pneumatic tire in wet gripping performance and in steering stability under high-temperature conditions with a good balance, Patent Document 3 listed below describes a technique of blending, into a rubber composition, silica and a crystalline higher-α-olefin copolymer having a melting point of 60° C. or lower.

Furthermore, in order to improve a vulcanized rubber in tear strength, Patent Document 4 listed below describes a technique of blending a polyolefin copolymer or polypropylene into a rubber composition, which is a raw material for the vulcanized rubber.

PRIOR ART DOCUMENTS

Patent Documents

Patent Document 1: JP-A-2016-30800
Patent Document 2: JP-A-2016-29118
Patent Document 3: JP-A-2011-79940
Patent Document 4: JP-A-2002-534548

However, the present inventors have made eager investigations to find that when the rubber composition in each of the precedent techniques is made into a vulcanized rubber, there remains a room to be further improved in compatibility between the wet performance and the rigidity of the resultant tires. Additionally, there remains a room to be further improved also in the workability of the rubber composition.

SUMMARY OF THE INVENTION

In the light of the actual situation, the present invention has been made, and an object thereof is to provide a rubber composition which is excellent in workability and is a raw material for a vulcanized rubber giving a tire improved in wet performance and rigidity with a good balance.

The above-mentioned problems can be solved by the present invention, which is a rubber composition including a rubber component; and a completely amorphous olefin based elastomer having a glass transition temperature Tg of −40 to 20° C. in an amount of 1 to 40 parts by mass when the entire amount of the rubber component is regarded as 100 parts by mass.

The rubber composition according to the present invention includes the specified olefin based elastomer in an amount in the predetermined range. In this manner, the rubber composition exhibits a plasticizing effect for rubber. As a result, the rubber composition is improved in workability, and further while the rigidity of the resultant vulcanized rubber is maintained, the tanδ thereof in a high temperature range can be improved. Thus, the resultant tire is improved in wet performance. When the rubber composition according to the present invention further includes a liquid rubber in an amount of 1 to 40 parts by mass, a further improvement is favorably made in the workability of the rubber composition and in the wet performance and the rigidity of the tire of the resultant vulcanized rubber.

DETAILED DESCRIPTION OF THE PREFERRED EMBODIMENTS

The rubber composition according to the present invention is characterized by including a completely amorphous olefin based elastomer having a glass transition temperature Tg of −40 to 20° C.

The olefin based elastomer is, for example, a polyolefin having, as an olefin for its recurring units, an α-olefin such as ethylene, propylene, butylene, 1-pentene, 4-methylpentene, 1-hexene or 1-octene. It is preferred to use a polymer having, as a monomer for its recurring units, at least one monomer selected from the group consisting of ethylene, propylene and butylene out of the above-mentioned olefins for the recurring units.

In the present invention, the polyolefin is, particularly, a polyolefin which has a glass transition temperature Tg of −40 to 20° C. and is completely amorphous. In order to make an improvement of the rubber composition in workability and a further improvement of a tire of the resultant vulcanized rubber in wet performance and rigidity, it is more preferred to use a polyolefin having a Tg of −20 to 10° C.

When the entire amount of a rubber component included in the rubber composition according to the present invention is regarded as 100 parts by mass, the rubber composition includes the completely amorphous olefin based elastomer, which has a Tg of −40 to 20° C., in an amount of 1 to 40 parts by mass. In order to make an improvement of the rubber composition in workability and a further improvement of a tire of the resultant vulcanized rubber in wet performance and rigidity, the rubber composition includes the specified olefin based elastomer in an amount of 1 to 25 parts by mass when the entire amount of the rubber component is regarded as 100 parts by mass.

The rubber composition according to the present invention preferably includes, as the rubber component, a diene rubber. Examples of the diene rubber include natural rubber (NR), polyisoprene rubber (IR), polybutadiene (BR), poly(styrene butadiene) rubber (SBR), chloroprene rubber (CR), and nitrile rubber (NBR). It is preferred to use, as necessary, a rubber yielded by modifying a terminal of each molecule of a rubber as described above (for example, terminal-modified SBR), or a rubber yielded by modifying a rubber as described above to give a desired property to the rubber (for example, modified NR).

In order to improve the workability of the rubber composition, the rigidity of the resultant vulcanized rubber, and the wet performance of the resultant tire with a good balance, it is preferred to blend terminal-modified SBR, out of the above-mentioned diene rubbers, into the rubber composition. It is particularly preferred that the rubber composition include terminal-modified SBR in an amount of 5 to 80 parts by mass when the entire amount of the rubber component is regarded as 100 parts by mass.

When the rubber composition according to the present invention further includes a liquid rubber, a further improvement is favorably made in the workability of the rubber composition, and the wet performance and the rigidity of a tire of the resultant vulcanized rubber. The liquid rubber is made of chain molecules each having a molecular weight of several thousands; can undergo crosslinkage and chain elongation reaction to turn to a rubber elastomer; and has fluidity. The liquid rubber preferably has, at a terminal of each of the molecules thereof, a functional group or radical, such as an amino, hydroxy, carboxy, isocyanate or thiol group, or a halogen radical. Examples of the liquid rubber include liquid rubbers of diene rubbers (such as 1,2-BR, 1,4-BR, 1,4-IR, SBR, NBR, CR, and IIR), of silicone rubbers, of urethane rubbers, and of polysulfide rubbers. The blend amount of the liquid rubber in the rubber composition is preferably from 1 to 40 parts by mass, more preferably from 1to 20 parts by mass when the entire amount of the rubber component is regarded as 100 parts by mass.

The rubber composition according to the present invention preferably includes silica as a filler. The species of the silica may be a species usable for ordinary rubber-reinforcement, such as wet silica, dry silica, sol-gel silica or surface-treated silica. Out of these species, wet silica is preferred. The blend amount of the silica is preferably front 20 to 120 parts by mass, more preferably from 40 to 100 parts by mass when the entire amount of the rubber component is regarded as 100 parts by mass.

The rubber composition may include a silane coupling agent The silane coupling agent is not particularly limited as far as the agent is a silane coupling agent containing, in the molecule thereof, sulfur. In the rubber composition, various silane coupling agents are usable which are each blended together with silica. Examples thereof include sulfide silanes such as bis(3-triethoxysilylpropyl) tetrasulfide (for example, "Si 69" manufactured by Degussa AG), bis(3-triethoxysilylpropyl) disulfide (for example, "Si 75" manufactured by Degussa AG), bis(2-triethoxysilylethyl) tetrasulfide, bis(4-triethoxysilylbutyl) disulfide, bis(3-trimethoxysilylpropyl) tetrasulfide, and bis(2-trimethoxysilylethyl) disulfide; mercaptosilanes such as γ-mercaptopropyltrimethoxysilane, γ-mercaptopropyltriethoxysilane, mercaptopropylmethyldimethoxysilane, mercaptopropyldimethylmethoxysilane, and mercaptoethyltriethoxysilane; and protected mercaptosilanes such as 3-octanoylthio-1-propyltriethoxysilane, and 3-propionylthiopropyltrimethoxysilane. The blend amount of the silane coupling agent is preferably from 1 to 20 parts by mass, more preferably from 3 to 10 parts by mass for 100 parts by mass of the silica.

In addition to the diene rubber, olefin based elastomer, liquid rubber, silica and silane coupling agent each detailed above, the following may be blended into the rubber composition according to the present invention: carbon black, vulcanization blending agents, an antiaging agent, zinc oxide, stearic acid, softeners such as wax and oil, a processing aid, and others.

The species of the carbon black may be any carbon black species used in an ordinary rubber industry, such as SAF, ISAF, HAF, FEF or GPF, or may be an electroconductive carbon black species such as acetylene black or ketjen black.

The carbon black is blended into the rubber composition according to the present invention in an amount preferably from 1 to 80 parts by mass, more preferably from 5 to 60 parts by mass for 100 parts by mass of the diene rubber.

The antiaging agent may be an antiaging agent used ordinarily for rubbers, examples thereof including aromatic amine type, amine-ketone type, monophenolic type, bisphenolic type, polyphenolic type, dithiocarbamate type, and thiourea type antiaging agents. Such antiaging agents may be used singly or in the form of an appropriate mixture of two or more thereof. The antiaging agent content is preferably from 0.1 to 10 parts by mass for 100 parts by mass of the rubber component.

Examples of the vulcanization blending agents include vulcanizing agents such as sulfur and organic peroxides, a vulcanization accelerator, a vulcanization accelerator aid, and a vulcanization retardant.

The species of the sulfur as one of the vulcanization blending agents may be any ordinary sulfur species for rubbers. Examples thereof include powdery sulfur, precipitated sulfur, insoluble sulfur, and highly dispersible sulfur. When physical properties, the durability and others of the resultant vulcanized rubber are considered, the blend amount of the sulfur is preferably from 0.1 to 10 parts by mass for 100 parts by mass of the rubber component, the amount being in terms of the sulfur content.

The vulcanization accelerator may be a vulcanization accelerator used ordinarily for rubber-vulcanization. Examples thereof include sulfonamide type, thiuram type, thiazole type, thiourea type, quanidine type, and dithiocarbamate type vulcanization accelerators. Such vulcanization accelerators may be used singly or in the form of an appropriate mixture of two or more thereof. The blend amount of the vulcanization accelerator(s) is preferably from. 0.1 to 10 parts by mass for 100 parts by mass of the rubber component.

The rubber composition according to the present invention can be yielded by using a kneading machine used in an ordinary rubber industry, such as a Banbury mixer, a kneader or a roll, to mix/knead the diene rubber, olefin based elastomer, liquid rubber, silica and silane coupling agent, each detailed above, and components that may be optionally used, which are carbon black, vulcanization blending agents, an antiaging agent, zinc oxide, stearic acid, softeners such as wax and oil, a processing aid and others, The method for blending each component with each other is not particularly limited, and may foe, for example, a method of mixing/kneading, in advance, blending components other than the vulcanization blending agents such as the sulfur-containing vulcanizing agent and the vulcanization accelerator to prepare a masterbatch, adding the remaining components thereto, and further mixing/kneading the entire components; a method of adding, each component, in any order, and then mixing/kneading the components; or a method of adding the entire components simultaneously and mixing/kneading the components.

EXAMPLES

Hereinafter, a description will be made about, examples demonstrating the subject matter and the advantageous effects of the present invention specifically, and others. In evaluating-items in the examples, and comparative examples, evaluations were made on the basis of evaluation conditions described below about rubber samples each yielded by heating and vulcanizing each rubber composition at 150° C. for 30 minutes.

(1) Wet Performance (Wet Gripping Performance)

A viscoelasticity tester manufactured by Toyo Seiki Seisaku-sho, Ltd. is used to measure the loss tangent tanδ of one of the samples of each of the above-mentioned examples at a frequency of 10 Hz, a static strain of 10%, a dynamic strain of 1% and a temperature of 0° C. About each of the examples, the measured value is represented as an index relative to the value of Comparative Example 1, this value being regarded as 100. It is meant that as the resultant numerical value is larger, the rubber composition is better in wet performance.

(2) Rigidity (Hardness)

A type-A durometer according to JIS K6253 is used to measure the hardness of one of the samples of each of the above-mentioned examples at a temperature of 23° C. About each of the examples, the measured value is represented as an index relative to the value of Comparative Example 1, this value being regarded as 100. It is meant that as the resultant numerical value is larger, the rubber composition is better in rigidity, (3) Workability In accordance with JIS K6300, a rotor-less Mooneymeasuring instrument manufactured by Toyo Seiki Seisaku-sho, Ltd. is used to heat the unvulcanized rubber of each of the above-mentioned examples at 100° C. for 1 minute by remaining heat, and measure, after 4 minutes, the torque value thereof in the unit of Mooney. About each of the examples, the measured value is represented as an index relative to the value of Comparative Example 1, this value being regarded as 100. It is meant that as the resultant numerical value is lover, the rubber composition is better in workability.

(Preparation of Each Rubber Composition)

In a blend formulation in Table 1, a rubber composition of each of Examples 1 to 7 and Comparative Examples 1 to 5 was formulated, and then kneaded using an ordinary Banbury mixer to prepare a rubber composition. The blending agents shown in Table 1 are as follows (in Table 1, the blend amount of each of the blending agents is represented as a numerical value (in the unit of parts by mass) that is relative to 100 parts by mass of rubber components).

a) Elastomer components:
  Olefin based elastomer 1: amorphous polyolefin, "TAFTHREN X 1102", manufactured by Sumitomo Chemical Co., Ltd.; Tg: −9° C.
  Olefin based elastomer 2: amorphous polyolefin, "TAFTHREN X 1104", manufactured by Sumitomo Chemical Co., Ltd.; Tg: −24° C. Olefin based elastomer 3: amorphous polyolefin, "APL 6509T", manufactured by Mitsui Chemicals, Inc.; Tg: 80° C.
  Olefin based elastomer 4: crystalline polyolefin, "TAFMER P-0275", manufactured by Mitsui Chemicals, Inc.; Tm: 28° C.
  Styrene based thermoplastic elastomer: styrene-(hydrogenated SB)-styrene block copolymer, "S.O.E. S 1611", manufactured by Asahi Kasei Corporation; Tg: 9° C.

b) Rubber components:
  SBR 1: terminal-unmodified SBR, "VSL 5025-0HM" manufactured by Lanxess AG
  SBR 2: terminal-modified SSBR, "HPR 350", manufactured by JSR Corporation
  BR: "BR 150B", manufactured by Ube Industries, Ltd.

c) Silica: "NIPSIL AQ", manufactured by Tosoh Silica Corporation d) Carbon black: "DIABLACK N341", manufactured by Mitsubishi Chemical Corporation e) Silane coupling agent: "Si 69", manufactured by Evonik Degussa GmbH f) Oil: "PROCESS NC 140", manufactured by Japan Energy Corporation g) Liquid oil: liquid polybutadiene, "LBR 307", manufactured by Kuraray Co., Ltd.; Tg −95° C.

h) Zinc flower: "Zinc flower No. 1", manufactured by Mitsui Mining & Smelting Co., Ltd.

i) Antiaging agent: "ANTIGEN 6C", manufactured by Sumitomo Chemical Co., Ltd.

j) Stearic acid: "LUNAC S-20", manufactured by Kao Corporation k) Wax: "OZOACE 0355", manufactured by Nippon Seiro Co., Ltd.

l) Sulfur: "5%-oil-blended powdery sulfur", manufactured by Tsurumi Chemical Industry Co., Ltd.

m) Vulcanization accelerators:
  Vulcanization accelerator 1: "SOXINOL CZ", manufactured by Sumitomo Chemical Co., Ltd.
  Vulcanization accelerator 2: "NOCCELER D", manufactured by Guchi Shinko Chemical Industrial Co., Ltd.

TABLE 1

|  | Comparative Example 1 | Comparative Example 2 | Comparative Example 3 | Comparative Example 4 | Comparative Example 5 | Example 1 |
|---|---|---|---|---|---|---|
| Olefin based elastomer 1 |  |  |  |  |  | 10 |
| Olefin based elastomer 2 |  |  |  |  | 50 |  |
| Olefin based elastomer 3 |  | 20 |  |  |  |  |
| Olefin based elastomer 4 |  |  | 20 |  |  |  |
| Styrene based thermoplastic elastomer |  |  |  | 20 |  |  |
| SBR 1 (terminal-unmodified) | 70 | 70 | 70 | 70 | 70 | 70 |
| SBR 2 (terminal-modified) |  |  |  |  |  |  |
| BR | 30 | 30 | 30 | 30 | 30 | 30 |
| Silica | 70 | 70 | 70 | 70 | 70 | 70 |
| Coupling agent | 7 | 7 | 7 | 7 | 7 | 7 |
| Carbon black | 10 | 10 | 10 | 10 | 10 | 10 |
| Silane coupling agent | 7 | 7 | 7 | 7 | 7 | 7 |
| Oil | 20 | 20 | 20 | 20 | 20 | 20 |
| Liquid rubber |  |  |  |  |  |  |
| Zinc flower | 3.0 | 3.0 | 3.0 | 3.0 | 3.0 | 3.0 |
| Antiaging agent | 2.0 | 2.0 | 2.0 | 2.0 | 2.0 | 2.0 |
| Stearic acid | 2.0 | 2.0 | 2.0 | 2.0 | 2.0 | 2.0 |
| Wax | 2.0 | 2.0 | 2.0 | 2.0 | 2.0 | 2.0 |
| Sulfur | 1.5 | 1.5 | 1.5 | 1.5 | 1.5 | 1.5 |

TABLE 1-continued

|  | | | | | | |
|---|---|---|---|---|---|---|
| Vulcanization accelerator 1 | 1.8 | 1.8 | 1.8 | 1.8 | 1.8 | 1.8 |
| Vulcanization accelerator 2 | 2.0 | 2.0 | 2.0 | 2.0 | 2.0 | 2.0 |
| Workability | 100 | 105 | 106 | 98 | 96 | 92 |
| Rigidity | 100 | 103 | 104 | 100 | 88 | 102 |
| Wet gripping performance | 100 | 98 | 100 | 102 | 132 | 115 |

|  | Example 2 | Example 3 | Example 4 | Example 5 | Example 6 | Example 7 |
|---|---|---|---|---|---|---|
| Olefin based elastomer 1 | 20 |  | 20 | 20 | 20 | 20 |
| Olefin based elastomer 2 |  | 20 |  |  |  |  |
| Olefin based elastomer 3 |  |  |  |  |  |  |
| Olefin based elastomer 4 |  |  |  |  |  |  |
| Styrene based thermoplastic elastomer |  |  |  |  |  |  |
| SBR 1 (terminal-unmodified) | 70 | 70 | 35 |  | 70 | 70 |
| SBR 2 (terminal-modified) |  |  | 35 | 70 |  |  |
| BR | 30 | 30 | 30 | 30 | 30 | 30 |
| Silica | 70 | 70 | 70 | 70 | 70 | 70 |
| Coupling agent | 7 | 7 | 7 | 7 | 7 | 7 |
| Carbon black | 10 | 10 | 10 | 10 | 10 | 10 |
| Silane coupling agent | 7 | 7 | 7 | 7 | 7 | 7 |
| Oil | 20 | 20 | 20 | 20 |  |  |
| Liquid rubber |  |  |  |  | 10 | 20 |
| Zinc flower | 3.0 | 3.0 | 3.0 | 3.0 | 3.0 | 3.0 |
| Antiaging agent | 2.0 | 2.0 | 2.0 | 2.0 | 2.0 | 2.0 |
| Stearic acid | 2.0 | 2.0 | 2.0 | 2.0 | 2.0 | 2.0 |
| Wax | 2.0 | 2.0 | 2.0 | 2.0 | 2.0 | 2.0 |
| Sulfur | 1.5 | 1.5 | 1.5 | 1.5 | 1.5 | 1.5 |
| Vulcanization accelerator 1 | 1.8 | 1.8 | 1.8 | 1.8 | 1.8 | 1.8 |
| Vulcanization accelerator 2 | 2.0 | 2.0 | 2.0 | 2.0 | 2.0 | 2.0 |
| Workability | 90 | 92 | 90 | 88 | 88 | 86 |
| Rigidity | 100 | 99 | 101 | 100 | 100 | 102 |
| Wet gripping performance | 125 | 120 | 122 | 118 | 126 | 124 |

From the results in Table 1, it is understood that the rubber compositions of Examples 1 to 5 are excellent in workability, and further the vulcanized rubbers of the rubber compositions are excellent in wet performance and rigidity. It is also understood that, in particular, the liquid-rubber-blended rubber compositions are excellent in workability, and further the vulcanized rubbers thereof are excellent in wet performance.

What is claimed is:

1. A rubber composition, comprising:
   a rubber component; and
   a completely amorphous olefin based elastomer,
   wherein the rubber component is a diene rubber,
   wherein the completely amorphous olefin based elastomer has a glass transition temperature Tg of −40 to 20° C. in an amount of 1 to 40 parts by mass when the entire amount of the rubber component is regarded as 100 parts by mass;
   wherein the rubber composition includes terminal modified SBR in an amount of 5 to 80 parts by mass when the entire amount of the rubber component is regarded as 100 parts by mass.

2. The rubber composition according to claim 1, further comprising a liquid rubber in an amount of 1 to 40 parts by mass when the entire amount of the rubber component is regarded as 100 parts by mass.

3. The rubber composition according to claim 1, wherein the completely amorphous olefin based elastomer is a polyolefin having recurring units selected from the group consisting of ethylene, propylene, butylene, 1-pentene, 4-methylpentene, 1-hexene and 1-octene.

4. The rubber composition according to claim 1, wherein the glass transition temperature Tg of the completely amorphous olefin based elastomer is −20 to 10° C.

5. The rubber composition according to claim 1, wherein the amount of the completely amorphous olefin based elastomer is 1 to 25 parts by mass when the entire amount of the rubber component is regarded as 100 parts by mass.

* * * * *